(12) United States Patent
Couturier et al.

(10) Patent No.: US 8,408,447 B2
(45) Date of Patent: Apr. 2, 2013

(54) METHOD FOR MANUFACTURING A MODULE WITH A HOLLOW AREA BY HOT ISOSTATIC COMPRESSION

(75) Inventors: Raphael Couturier, Sassenage (FR); Charlotte Bernard, Contamine sur Arve (FR); Magali Reytier, Villard de Lans (FR); Emmanuel Rigal, Sassenage (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 0 days.

(21) Appl. No.: 13/496,212

(22) PCT Filed: Sep. 23, 2010

(86) PCT No.: PCT/EP2010/064050
§ 371 (c)(1),
(2), (4) Date: Mar. 15, 2012

(87) PCT Pub. No.: WO2011/036207
PCT Pub. Date: Mar. 31, 2011

(65) Prior Publication Data
US 2012/0168078 A1    Jul. 5, 2012

(30) Foreign Application Priority Data
Sep. 25, 2009  (FR) ...................................... 09 56655

(51) Int. Cl.
*B23K 20/00*    (2006.01)
*B23K 31/02*    (2006.01)

(52) U.S. Cl. .................... 228/193; 228/233.1; 228/233.2

(58) Field of Classification Search ............... 228/124.6, 228/193–195, 233.1, 233.2
See application file for complete search history.

(56) References Cited

U.S. PATENT DOCUMENTS

| 4,065,046 A | * | 12/1977 | Roberts et al. ................. 228/156 |
| 4,883,219 A | * | 11/1989 | Anderson et al. ............. 228/190 |
| 5,284,288 A | | 2/1994 | Woodward |
| 7,299,967 B2 | * | 11/2007 | Schulz-Harder .............. 228/183 |
| 7,804,039 B2 | * | 9/2010 | Hasegawa et al. ......... 219/78.16 |
| 2008/0116246 A1 | | 5/2008 | Rigal et al. |

FOREIGN PATENT DOCUMENTS

| FR | 2 879 489 | | 6/2006 |
| GB | 2 269 556 | | 2/1994 |
| JP | 57134285 A | * | 8/1982 |
| JP | 05146920 A | * | 6/1993 |
| JP | 2006263746 A | * | 10/2006 |

OTHER PUBLICATIONS

Norajitra, P., et al., "HIP experiments on the first wall and cooling plate specimens for the EU HCPB blanket," Journal of Nuclear Materials, vol. 307-311, pp. 1558-1562, (Dec. 1, 2002).
International Search Report Issued Feb. 7, 2011 in PCT/EP10/64050 Filed Sep. 23, 2010. U.S. Appl. No. 13/393,649, filed Mar. 1, 2012, Rigal, et al.

\* cited by examiner

*Primary Examiner* — Kiley Stoner
*Assistant Examiner* — Carlos Gamino
(74) *Attorney, Agent, or Firm* — Oblon, Spivak, McClelland, Maier & Neustadt, L.L.P.

(57) ABSTRACT

A method for manufacturing a module with a hollow area by hot isostatic compression, including: making an assembly including superposed elements defining the hollow area, the assembly forming a sealed casing containing the hollow area, including at least one meltable obturation member separating the hollow area from the outside of the assembly; followed by hot isostatic compression of the assembly, to obtain diffusion-welding of its elements, by letting temperature and pressure conditions change over time to cause a rupture of the meltable obturation member allowing pressurization gas to penetrate into the hollow area.

10 Claims, 4 Drawing Sheets

METHOD FOR MANUFACTURING A MODULE WITH A HOLLOW AREA BY HOT ISOSTATIC COMPRESSION

TECHNICAL FIELD

The invention generally relates to the field of manufacturing, by diffusion-welding applied by hot isostatic compression, of modules with a hollow area.

In particular, the invention relates to the manufacturing of modules for which the hollow area assumes the shape of one or a plurality of channels, preferably intended for circulation of fluid.

Many applications may be contemplated for this module, like heat exchangers, and preferentially so-called compact plate exchangers, for which the heat exchanges obtained are very satisfactory, because of the large ratio between the exchange surface areas and the volume of the exchanger. For example, this may be a heat exchanger system comprising a module or a stack of modules alternately forming along a direction for stacking the plates, a first fluid circulation area and a second fluid circulation area, and designed so that a chemical, possibly catalytic reaction occurs, in at least one of these fluidic circulation areas. Thus, because of the chemical reaction encountered within at least one of these areas, such exchangers are also called reactors. More generally, such heat exchangers are called exchanger/reactor.

It is noted that several uses may be contemplated for this type of exchanger system, e.g. producing chemical or pharmaceutical products.

Other applications may also be contemplated for the hollow module, in cooled pressure apparatuses, heat absorbers, heat reclaimers, and more generally in all devices including internal channels for circulation of fluid.

STATE OF THE PRIOR ART

From the prior art, the manufacturing of a hollow module from two grooved plates bearing against each other is known in order to jointly define cavities in which cubes are inserted for which the geometry corresponds to that of the desired circulation channels. In this scenario, the surfaces to be assembled by diffusion are first of all cleaned, the parts are stacked and then the periphery of both plates is made leakproof by welding or by inserting these plates into a casing also made leakproof by welding. Further, the periphery of the ends of the tube is made leakproof by welding with these two same plates or with the casing, also called a container.

After conventional degassing of the thereby formed assembly, the latter is subject to a hot isostatic compression cycle, during which the pressurization gas cannot penetrate into the interfaces between the elements of the assembly, the latter may then be welded suitably to each other by diffusion. On the other hand, the pressurization gas penetrates the interior of the tubes so that they are subject to the same pressure as that of the outer surfaces of the assembly. No crushing of the tubes consequently occurs, which keep their initial geometry.

Nevertheless, in certain embodiments, the shape of the channels is such that it is unachievable from tubes, notably when it includes bends, which are too marked to be obtainable by bending of straight tubes.

In this respect, it is noted that assembling by diffusion-welding with hot isostatic compression of grooved plates, without any tubes interposed between the latter, is only possible to the expense of a significant degradation of the structure. Indeed, if the inlets and outlets of the channels are not sealably obturated, the pressurization gas penetrates between the groove plates and prevents their welding. Conversely, if the inlets and outlets of the channels are obturated sealably, the latter are crushed by the pressure, which leads to an unacceptable loss in the dimensional accuracy of the channels, or even to disappearance of the latter. In such a case, a decrease in the pressure would of course generate weaker crushing of the channels, but would also be accompanied by a reduction in the resistance of the welding junctions.

Another technical solution for avoiding the crushing of the channels consists of filling the grooves with cores made in a material which may be removed after assembling, by chemical dissolution or by another means, as this is described in document JP-A-2006 263746. However, in practice, the definition of the filling material and its removal prove to be very difficult.

Further, another manufacturing method is known from document FR-A-2 879 489. It consists of machining grooves anticipating the channels in a plate, sealing the top of these grooves by adding thereto thin strips by welding, and then assembling by diffusion-welding with hot isostatic compression on the grooved plate, a second element with the shape of a lid covering the thin strips. This solution has several drawbacks, among which high cost, the difficulty of welding thin strips when the channels are not straight, the difficulty of controlling and guaranteeing the seal of all the welds of the strips for a structure comprising multiple channels or great lengths of channels, or further the impossibility of building channels with a non-regular channel width on the height of the channel, in view of forming so-called <<3D>> channels.

Finally, another manufacturing method is known from the document entitled <<HIP experiments on the first wall and cooling plate specimens for the EU HCPB blanket>>, P. Norajitra et al., Journal of Nuclear Materials 307-311 (2002). A principle is described therein, consisting of assembling elementary parts, by diffusion-welding with hot isostatic compression in two steps. All or part of the elementary parts give the possibility of rebuilding, by juxtaposing them, the desired channels. These elementary parts are inserted into a sealed container in order to form an assembly which is then degassed and then obturated. Alternatively, the periphery of the elementary parts is sealably welded, and the channels are obturated, always so as to form a leakproof casing containing the hollow area.

During the first step for diffusion welding, the temperature and pressure conditions of hot isostatic compression, as well as the duration of the step, are retained on the one hand so as to obtain welding of the parts making their interfaces leakproof, and so that the possible deformations of the channels remain negligible on the other hand.

After this first step, the assembly is pierced facing the channels, so as to allow air to penetrate therein. The seal of the hollow area is then broken, the second welding step follows by diffusion, achieved at a higher pressure so as to guarantee that a diffusion weld of good quality is obtained between the elementary parts. During this second step, the pressurization gas penetrates the channels, unlike in the first welding step, so that crushing of the channels may be avoided and an acceptable geometry may be retained.

This solution has many drawbacks, among which the requirements of having the assembly pass twice into a hot isostatic compression enclosure, with venting between both steps in order to pierce the assembly at right angles to the channel. This generates long manufacturing times and high manufacturing costs. Further, the risks of error during the piercing operation are real since the question is of accurately piercing a component which may be of large size, and which may have undergone deformations during the first step making the localization of the channels delicate.

DISCUSSION OF THE INVENTION

The object of the invention is therefore to at least partly find a remedy to the aforementioned drawbacks, relating to embodiments of the prior art.

To do this, the object of invention is a method for manufacturing a module with a hollow area by hot isostatic compression, comprising:

a step for making an assembly comprising superposed elements defining the hollow area, said assembly being made so as to form a leakproof casing containing said hollow area, including at least one meltable obturation member separating said hollow area from the outside of the assembly; followed by a step for hot isostatic compression of said assembly, achieved so as to obtain a weld by diffusion of its elements, this step being achieved by letting the temperature and pressure conditions change so that the latter cause during this step, a failure of said meltable obturation member allowing the pressurization gas to penetrate into said hollow area.

Thus, the hot isostatic compression step comprises a first phase preceding the failure of the obturation member, a phase during which the elements of the assembly begin to be welded to the interfaces, by diffusion, without the pressurization gas being able to penetrate the hollow area and to perturb this welding at the interfaces. The weld observed during this first phase is sufficient for obtaining the seal at the interfaces, but has low mechanical strength, provided so as to be consolidated by the application of a second subsequent compression phase. Before initiation of this second compression phase, the temperature and pressure conditions applied cause failure of the obturation member, which is expressed by the penetration of the pressurization gas into the hollow area, unlike the first phase. This allows application of a much larger pressure than during the first phase, favorable to obtaining strong mechanical strength at the diffusion-welded interfaces, without causing crushing of the hollow area which may thus retain the desired geometry. This is explained by the fact that the inside of the hollow area is subject to the same pressure as the one being applied on the outer surfaces of the assembly undergoing compression.

This principle specific to the present invention is advantageous in that it provides simplicity of manufacturing, being expressed by a gain in terms of manufacturing times and costs. This gain especially results from the automatic failure of the obturation member during a same step of hot isostatic compression, not requiring extraction of the assembly out of the pressurization enclosure for piercing it and then reintroducing it into the enclosure, as this was the case in the prior art entitled <<HIP experiments on the first wall and cooling plate specimens for the EU HCPB blanket>>.

Further, the reliability of the method is satisfactory, since the rupture of the obturation member guarantees communication between the outside of the assembly and the hollow area, unlike the piercing operations described in the prior art which have just been mentioned.

The assembly may include one or more meltable obturation members, according to the encountered needs. In this respect, it is noted that several members may be superposed in order to create after their rupture, a same communication route between the outside of the assembly and the hollow area.

Further, the invention allows great freedom in selecting the shape of the hollow area, preferably assuming the shape of channels, notably if the latter are made by laser cutting in a metal sheet. The complex shape of the obtained channels, for example <<3D>> channels, advantageously leads to obtaining a compact and thermally highly performing module when it is used within an exchanger, and highly performing in mixing chemical reagents when it is used within an exchanger/reactor.

Finally, it does not require any brazing for assembling the elements, therefore does not have any problems in the case of the use of corrosive fluids.

Preferably, said temperature and pressure conditions are retained so as to achieve a first compression phase at a temperature $T_1$, a pressure $P_1$, for a duration $D_1$, and then to achieve a second compression phase at a temperature $T_2$, a pressure $P_2$ greater than pressure $P_1$, for a duration $D_2$, the rupture of said meltable obturation member being caused between the first and second compression phases. By pressure $P_1$ and $P_2$, is meant a substantially constant pressure over the durations $D_1$ and $D_2$.

Thus, the first compression phase is achieved at a lower pressure, nevertheless allowing the seal to be obtained at the interfaces of the elements of the assembly, without causing crushing of the hollow area. The highest pressure applied during the second phase as for it gives the possibility of obtaining consolidated mechanical junctions at the interfaces. The rupture of the obturation member is therefore achieved during the rise in pressure. Depending on the nature of this obturation element, this rupture is accomplished either under the effect of pressure, by bursting, or under the effect of temperature, by liquefaction or bursting when the melting temperature is approached. In this respect, it is noted that the temperature of the member also has an influence on the instant of its bursting by pressure, as well as the pressure has an influence on the instant at which a member being liquefied will break.

Whatever the case, when the member is designed so as to break under the effect of temperature, by liquefaction, the temperature $T_2$ is set to a value above the temperature $T_1$, and the melting point of the obturation member is comprised between $T_1$ and $T_2$. Further, the temperature $T_2$ may be set to a value above the temperature $T_1$ even when the obturation member is provided so as to break under the effect of pressure, by bursting, and this with the purpose of promoting welding by diffusion. $T_1$ and $T_2$ may nevertheless be identical or close, without departing from the scope of the invention.

Preferably, and in particular in the case when the alloy used is based on iron, nickel or copper, or stainless steel, or further a titanium-based alloy, such pressure $P_1$ is comprised between 50 and 200 bars, for example close to 150 bars, and the pressure $P_2$ is comprised between 1,000 and 2,000 bars, for example close to 1500 bars. It is clear that the pressures $P_1$ and $P_2$ may vary during $D_1$ and $D_2$ within the aforementioned limits, but are preferentially substantially constant.

Preferably, said temperatures $T_1$ and $T_2$ are each comprised between 900 and 1,200° C.

Preferably, as mentioned above, the obturation member forms a thermal fuse or a mechanical fuse. In the first case, the rupture of the fuse is obtained when it becomes fluid under the effect of heat, while in the second, it is obtained by breaking under the effect of pressure. In each of the cases, the broken fuse no longer fulfils its obturation function and consequently allows fluidic communication between the hollow area and the outside of the assembly.

For example, said obturation member assumes the shape of a membrane with an average thickness comprised between 0.3 and 0.5 mm.

Preferably, said obturation member is an integral part of one of said elements of the assembly, or else is added onto one of these elements, for example by welding.

Preferably, said hollow area assumes the form of one or of a plurality of fluid circulation channels.

Preferably, said module is provided for fitting out a heat exchanger system, even if all the aforementioned applications may be contemplated, without departing from the scope of the invention.

Preferably, said module assumes the form of a plate, as well as each of said constitutive elements of the assembly.

Other advantages and features of the invention will become apparent in the non-limiting detailed description below.

SHORT DESCRIPTION OF THE DRAWINGS

This description will be made with reference to the appended drawings wherein.

DETAILED DISCUSSION OF PARTICULAR EMBODIMENTS

Figure 1:
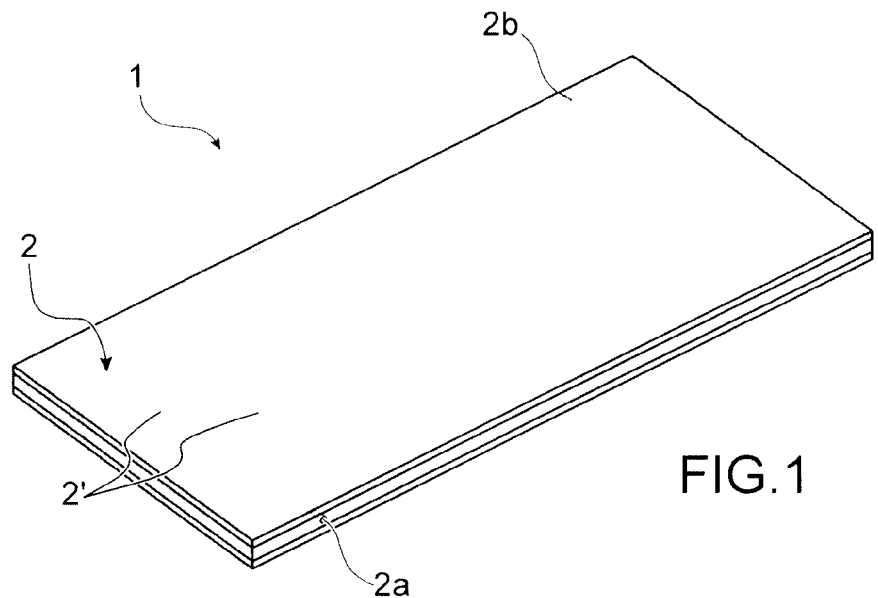
FIG. 1 illustrates a schematic perspective view of a fluid circulation module obtained subsequently to the application of the method according to a preferred embodiment of the present invention.

With reference to FIG. 1, a module 1 for a heat exchanger system preferably of the exchanger/reactor type maybe seen, for example provided for producing chemical or pharmaceutical products. For example, this module has a length of the order of 30 cm, a width of the order of 10 to 15 cm and a thickness of the order of 1 to 2 cm. However, any type of proportioning may be contemplated, and depending on the application of the system.

Module 1, for which the manufacturing methods specific to the present invention will be described hereafter, has a substantially parallelepipedal shape or plate shape, crossed by one or a plurality of channels 2 for fluid circulation. In the illustrated example, a single channel 2 is provided having an inlet 2a and an outlet 2b, between which are found a plurality of channel sections 2' preferably parallel to each other. The sections 2' are connected pairwise at their facing ends. The channel sections 2' may be substantially rectilinear, or may even adopt any other shape which is notoriously suitable, such as the so-called bent or zigzag shape, as this was illustrated schematically by the dotted lines of FIG. 1. Further, the section of these channels 2 may also be adapted depending on the encountered needs. As an indicative example, it may be square, rectangular or else further with a shape which may be changed over time in order to generate a <<3D>> channel.

Figure 2:
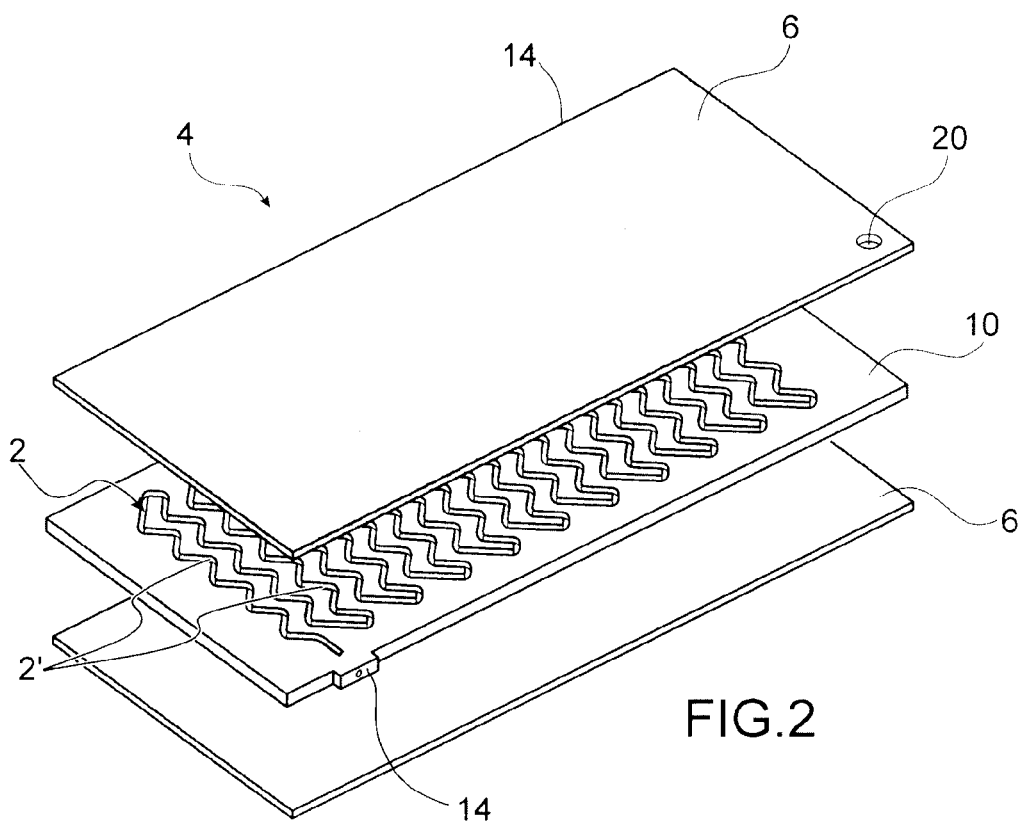
FIG. 2 illustrates an exploded perspective view of the assembly intended to form said module of FIG. 1 before its treatment.

In order to proceed with the manufacturing of this module 1, an assembly of stacked elements is made first, this assembly being generally referenced by reference 4 in FIG. 2.

The stacking may be carried out on a conventional, preferably horizontal support, on which a metal plate 6 in an alloy for example with high heat conductivity such as an alloy rich in copper, for example a CuCl alloy, is placed first of all.

On the surface of this plate 6, another plate 10 is positioned, machined through in order to show the channel 2. This machining is preferably carried out by laser cutting through the metal plate 10, preferably made in stainless steel, for example stainless steel 316L.

In the example shown, the section of each channel section 2' is square, with a side measuring about 3 mm.

Next, another plate 6 substantially identical with the first, with a thickness of the order of 3 mm, covers the grooved plate 10. Therefore, the channel sections 2' are obturated downwards by the lower plate 6 and upwards by the upper plate 6.

Figure 3:
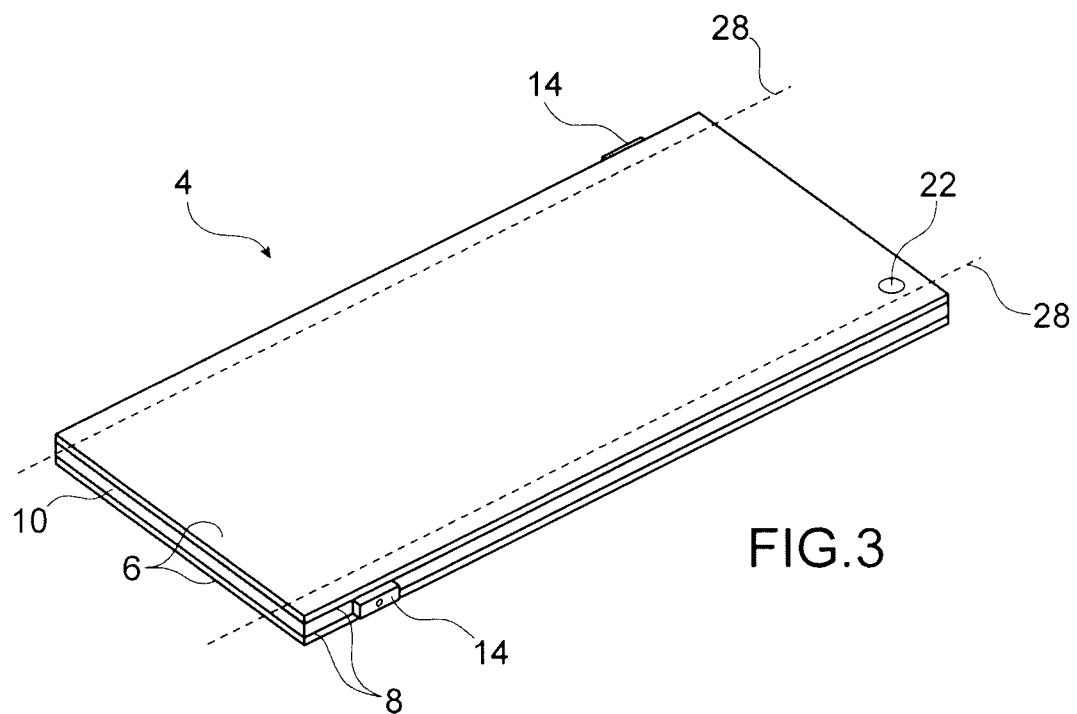
FIG. 3 illustrates a non-exploded perspective view of the assembly shown in FIG. 2.

One of the particularities of the present invention lies in the fact that the grooved plate 10 is equipped with one or several meltable obturation members separating the channel 2 forming a hollow area, from the outside of the assembly 4 shown in FIG. 3 in the stacked condition. More specifically, two obturation members are respectively provided at two protrusions 14 of the grooved plate 10, laid out facing the inlet and the outlet of the fluid circulation channel 2.

Figure 4:
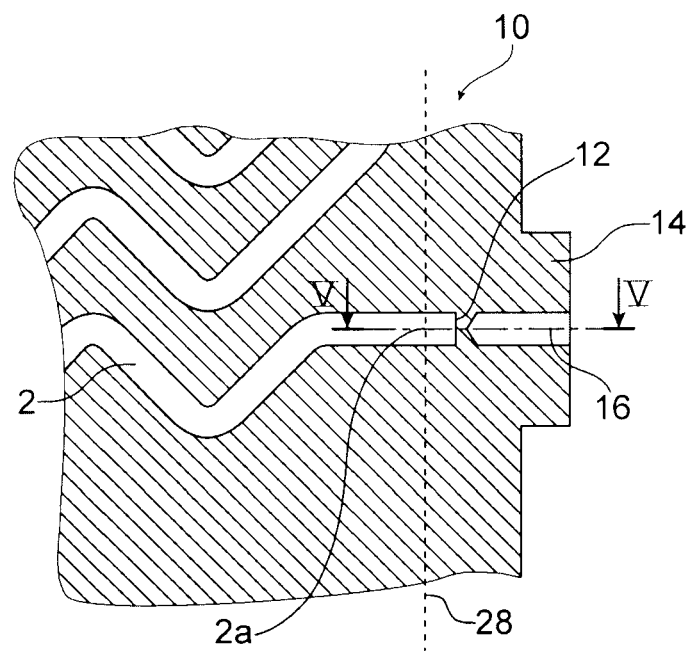
FIG. 4 illustrates a portion of the assembly shown in FIGS. 2 and 3.
Figure 5:
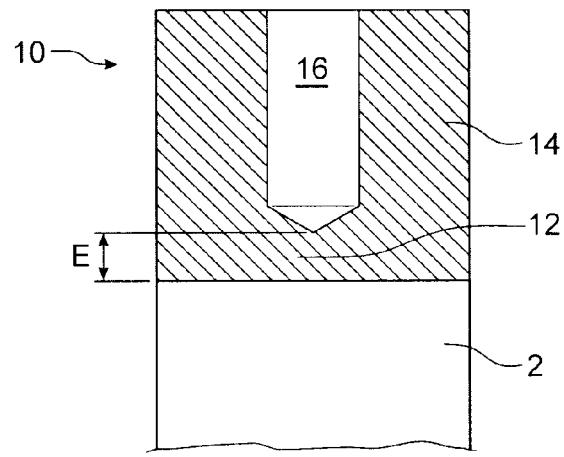
FIG. 5 is a sectional view taken along the line V-V of FIG. 4.

One of the meltable obturation members 12 is detailed in FIGS. 4 and 5, it being understood that the other one is identical or similar, both in terms of function and of structure. In these figures, it is actually possible to see that the protrusion 14 is located at right angles to the inlet 2a of the channel 2. A piercing 16 is made from the outside of the plate 10 through the protrusion 14, towards the channel 2. Nevertheless, this piercing 16 does not unblock the channel, since a material ligament is retained between the latter, as a membrane, in order to form the meltable obturation member 12. The diameter of the piercing 16 is of the order of 2 mm. The remaining material ligament with an average thickness E, preferably determined by a finite element calculation by using the laws of hot mechanical behavior of the material and the applied temperature and pressure conditions during the compression, is preferentially comprised between 0.3 and 0.5 mm, and even more preferentially of the order of 0.4 mm. As this will be detailed hereafter, its thickness is set so that it may fulfill its function consisting of ensuring the obturation of the channel 2 for a first hot isostatic compression phase, and then to automatically yield in order to subsequently allow introduction of the pressurization gas into the channel during a second hot isostatic compression phase.

Once the plates 6, 10 are stacked, the latter are welded together at their peripheries, preferably by TIG welding, in order to form a leakproof casing containing the channel forming a hollow area. In this specific case, the leakproof casing is therefore formed by both plates 6, the periphery of the grooved plate 10 including both meltable obturation members 12, and the peripheral wells referenced as 18 in FIG. 3.

Even if this has not been illustrated, it is noted that the presence of a single meltable member may be sufficient. The preferred embodiment shown in FIG. 3 consisting of placing more than one meltable member, in particular one at each end of the channel, gives the possibility of securing the method in the case when one of the members would be faulty.

An alternative embodiment consists of sliding the assembly 4 into a container including apertures for letting obturation member(s) emerge from the latter. The inside of the container has a shape mating that of the stack or is sufficiently flexible so as to deform during the hot isostatic compression, and to transmit the pressure to the assembly 4. The meltable members protruding on the outside of the container are then welded on their perimeter in order to seal the container/meltable member interface. This technique is notably preferred when the desired module comprises several fluid circulation stages, i.e. several superposed channels along the stacking direction of the plate, obtained by the stacking of grooved plates separated from each other by solid plates. It is also preferred when the periphery of the plates 6 and 10 cannot be welded, for example for reasons of metallurgical compatibility.

The making of the module 1 is continued by treating the assembly 4 by hot isostatic compression. Before the compression, degassing of the stack is carried out, by pumping via an orifice 20 made in the wall of the casing, here one of the plates 6, as shown in FIG. 2. Once degassing is completed, the orifice 20 is sealably obturated, with a stopper 22, in order to obtain the seal of the channel 2 with regard to the outside of the assembly 4.

Figure 6:
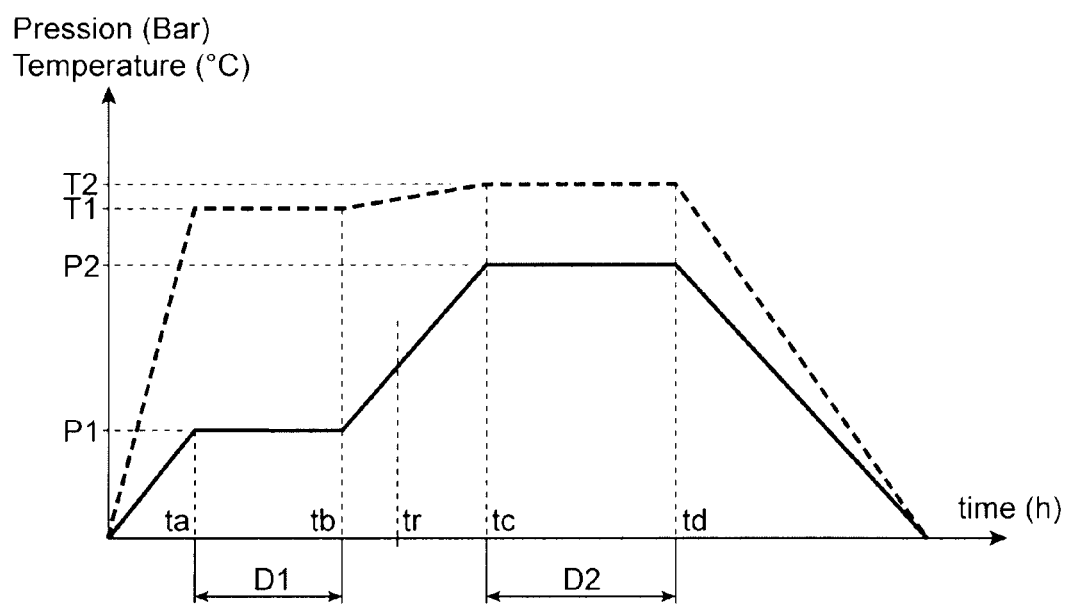
FIG. 6 is a graph showing the time dependence of the applied temperature and pressure conditions during the step for hot isostatic compression of the assembly.

The compression of the assembly 4 is performed in a suitable enclosure (not shown), by applying temperature and pressure conditions which will now be detailed with reference to FIG. 6.

As mentioned above, a rise in pressure and in temperature is first of all performed so that the latter respectively reach the values P1 and T1 at instant ta. This rise may last for one hour, or even longer, it being understood that the fuse remains inert.

From this instant ta, a first hot isostatic compression phase is carried out, during which the values T1 and P1 are respectively maintained at about 1,100° C. and 150 bars. During this first phase, the plates 6, 10 begin to weld with the interfaces by diffusion, i.e. in the solid state, without the pressurization gas being able to penetrate into the channel 2 and to perturb this welding. The welding observed during this first phase, for which the duration D1 is of about one hour, is sufficient for obtaining the seal of the interfaces, but has low mechanical resistance, intended to be consolidated by applying a second subsequent compression phase. Here, the aforementioned interfaces are of course contact surfaces between the plates 6 and 10.

The pressure P1 and the temperature T1 applied during this first phase are not sufficient for causing rupture of the obturation members 12, which resist by possibility slight deformation. Moreover it is the preservation of these members which guarantees that the pressurization gas will not perturb the welding at the interfaces.

The compression step is continued by a new rise in temperature and pressure, respectively to a value T2 of the order of 1,200° C. and a value P2 of the order of 1,500 bars.

It is during this rise in pressure, the duration of which D2 may be of the order of one to two hours, that each meltable obturation member 12 breaks by bursting under the effect of the applied pressure, the latter then fulfilling its function of a mechanical fuse. From the rupture instant tr, the seal of the casing is broken, and communication between the outside of the assembly 4 and the channel 2 is allowed. The pressurization gas may thus penetrate into the channel via the junction orifice 24, in other words the passage formed at the initially provided member 12, as this was schematized in FIG. 7. Preferably tr is close to tb.

Once the pressure P2 and the temperature T2 are reached, at instant tc, the second compression phase is initiated. It may last for about two hours, until the instant td corresponding to the beginning of the cooling. It gives the possibility of applying a much greater pressure than during the first phase, favorable for obtaining strong mechanical strength at the diffusion-welded interfaces, without causing crushing of the channel 2 which may thereby retain the desired geometry. This is explained by the fact that the interior of the channel 2 is here subject to the same pressure as the one being applied on the outer surfaces of the assembly undergoing compression.

The module 1, a so-called monolithic module, is then obtained, corresponding to a massive block, for example multimaterials, crossed by a fluid circulation channel 2.

Figure 7:
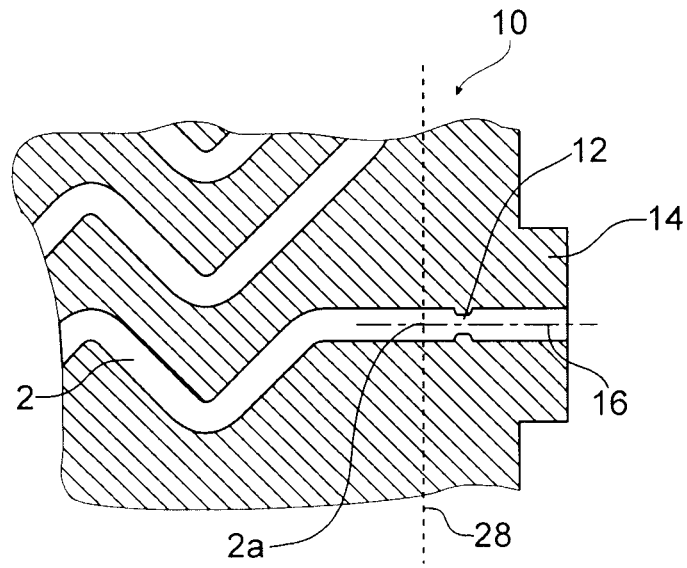
FIG. 7 illustrates a view similar to that of FIG. 5, after rupture of the meltable obturation member.

Before the use of the module 1, each junction orifice 24 is recalibrated by machining in order to allow satisfactory inflow/outflow of the fluid in the module, or else the latter is segmented according to the planes 28 schematized in FIGS. 3, 4 and 7, in order to show the inlet 2a/the outlet 2b.

During the use of the module in a heat exchanger system, the fluid is for example brought in through an inlet manifold (not shown) placed at the inlet 2a of the channel 2. The fluid then circulates by meandering in the channel 2, before escaping from the latter through the outlet 2b, and penetrating for example in an exhaust manifold (not shown) of the system.

Figure 8:
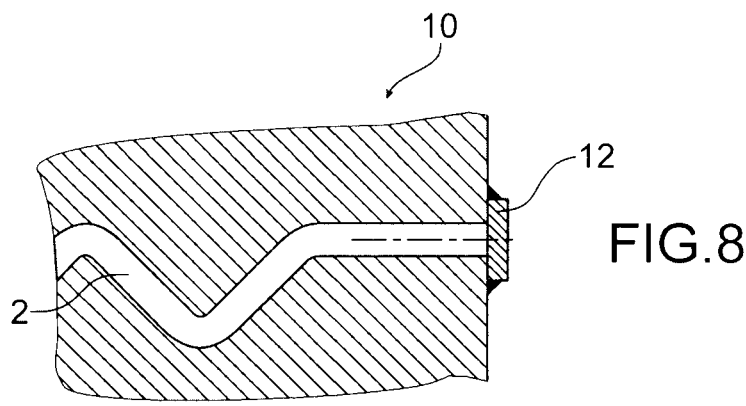
FIGS. 8 and 9 show alternative embodiments for the meltable obturation member.

Now with reference to FIG. 8, an alternative embodiment is shown for the meltable obturation member 12. The latter is no longer an integral part of the grooved plate 10, but is added onto the latter, preferably by welding. It may either be slid into an orifice provided for this purpose, or be added on an edge of the plate, as this is illustrated in FIG. 8. This member may assume the shape of a mechanical fuse similar to the one described above, or else the shape of a thermal fuse, the melting point of which is comprised between T1 and T2 so as to break during the rise in temperature initiated at instant tb. Any material may be contemplated, such as copper, or even an eutectic mixture.

Figure 9:
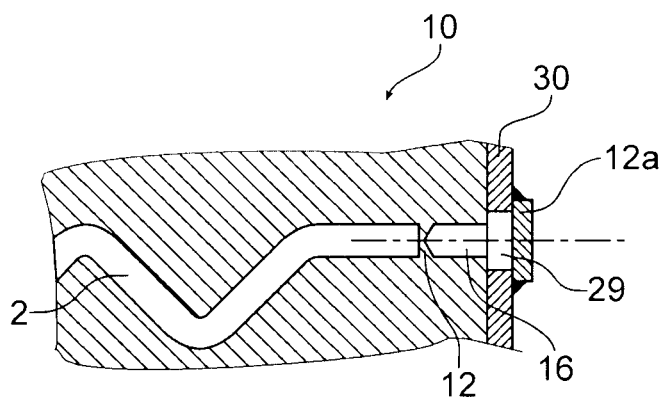

In FIG. 9, both previous solutions are combined, since a groove plate 10 is provided with the material ligament 12 facing the outlet of the channel 2 and of the piercing 16, as well as another member 12a obturating a through-orifice 29 made on a container 30 accommodating the assembly. In this scenario, the orifice 29 is located in the continuity of the piercing 16. Both fuses are here each intended to break during the rise in temperature and in pressure initiated at instant tb, simultaneously or successively, so that at instant tc of the initiation of the second compression phase, the channel 2 communicates with the outside of the casing 30. Preferentially, the fuse 12a is a thermal fuse, and the fuse 12 is a mechanical fuse; in this case, the thermal fuse protects the fuse 12 during the low pressure phase by insulating it from pressure. This has the purpose of reducing the early failure risk of the mechanical fuse 12 if the ligament thickness E is smaller than intended.

Of course, diverse modifications may be brought by one skilled in the art to the invention which has just been described, only as non-limiting examples.

The invention claimed is:

1. A method for manufacturing a module with a hollow area by hot isostatic compression, comprising:
    making an assembly comprising superposed elements defining the hollow area, the assembly being made to form a leakproof casing containing the hollow area, including at least one meltable obturation member separating the hollow area from an outside of the assembly;
    followed by hot isostatic compression of the assembly, as to obtain diffusion-welding of the elements of the assembly, and carried out by changing temperature and pressure conditions so that the changing temperature and pressure conditions cause during the hot isostatic compression a rupture of the meltable obturation member allowing pressurization gas to penetrate into the hollow area.

2. The method according to claim 1, wherein the temperature and pressure conditions are retained to achieve a first compression phase at temperature T1, a pressure P1, for a duration D1, and then to achieve a second compression phase at temperature T2, a pressure P2 greater than pressure P1, for a duration D2, the rupture of the meltable obturation member being caused between the first and second compression phases.

3. The method according to claim 2, wherein the pressure P1 is between 50 and 200 bars, and the pressure P2 is between 1,000 and 2,000 bars.

4. The method according to claim 2, wherein the temperatures T1 and T2 are each between 900 and 1,200° C.

5. The method according to claim 3, wherein the temperatures T1 and T2 are each between 900 and 1,200° C.

6. The method according to claim 1, wherein the obturation member forms a thermal fuse or a mechanical fuse.

7. The method according to claim 1, wherein the obturation member is an integral part of one of the elements of the assembly, or else is added onto one of these elements.

8. The method according to claim 1, wherein the hollow area assumes a form of one or a plurality of fluid circulation channels.

9. The method according to claim 1, wherein the module is provided for fitting out a heat exchanger system.

10. The method according to claim 1, wherein the module assumes a form of a plate.

* * * * *